United States Patent [19]
Boyd et al.

[11] Patent Number: 5,317,793
[45] Date of Patent: Jun. 7, 1994

[54] APPARATUS FOR INSTALLING BUSHINGS CONCENTRICALLY IN A BORE

[75] Inventors: Jerry L. Boyd, Auburn; Kenneth C. Cameron, Sr., Puyallyp, both of Wash.

[73] Assignee: The Boeing Company, Seattle, Wash.

[21] Appl. No.: 677,545

[22] Filed: Mar. 29, 1991

[51] Int. Cl.$^5$ ............................................. B23P 19/04
[52] U.S. Cl. ...................................... 29/252; 29/281.1
[58] Field of Search ..................... 29/238, 252, 281.1, 29/281.3; 254/93 R

[56] References Cited

U.S. PATENT DOCUMENTS

| | | | |
|---|---|---|---|
| 1,807,329 | 5/1931 | West et al. | 29/252 |
| 2,430,201 | 11/1947 | Wyscaver | 29/252 |
| 3,056,477 | 10/1962 | Wooley | 29/252 |
| 4,262,405 | 4/1981 | Bretzger et al. | 29/252 |
| 4,409,720 | 10/1983 | Boudreau | 29/252 |
| 4,485,542 | 12/1984 | Vasoll | 29/252 |

*Primary Examiner*—William E. Terrell
*Assistant Examiner*—Eileen P. Morgan
*Attorney, Agent, or Firm*—J. Michael Neary; B. A. Donahue

[57] ABSTRACT

Two bushings are installed concentrically in the two ends of a bore with an interference fit using an elongated mandrel which is maintained coaxially on the bore centerline by a guide inserted in one end of the bore while the bushing is pressed into the other end of the bore. The force to press the bushings into the bore is exerted by a pulling tool to which the mandrel is coupled, and that force is transmitted through the mandrel to the bushing by way of a collar attached to the mandrel. The force of the pulling tool exerted on the mandrel is reacted through an anvil attached to the barrel of the pulling tool and effectively in contact with the side of the part opposite to which the bushing is being pressed into the bore. The faces of the collar and the anvil are machined flat and perpendicular to the axis of the mandrel so that the squeezing force exerted between them on the bushing and the part is parallel to the axis of the bore. This ensures that the bushing is pressed straight into the bore and is held in a concentric orientation during the installation so there is no gouging of the walls of the bore and the bushing is installed exactly concentric with the bore and coaxial to the other bushing.

20 Claims, 10 Drawing Sheets

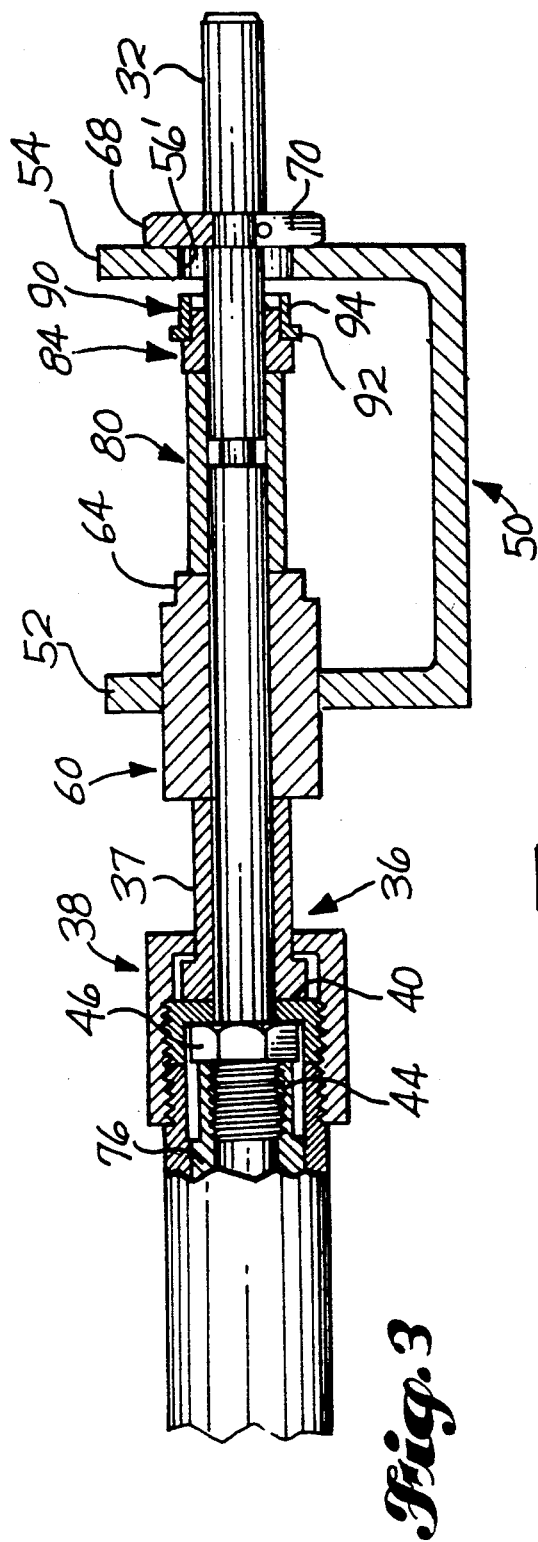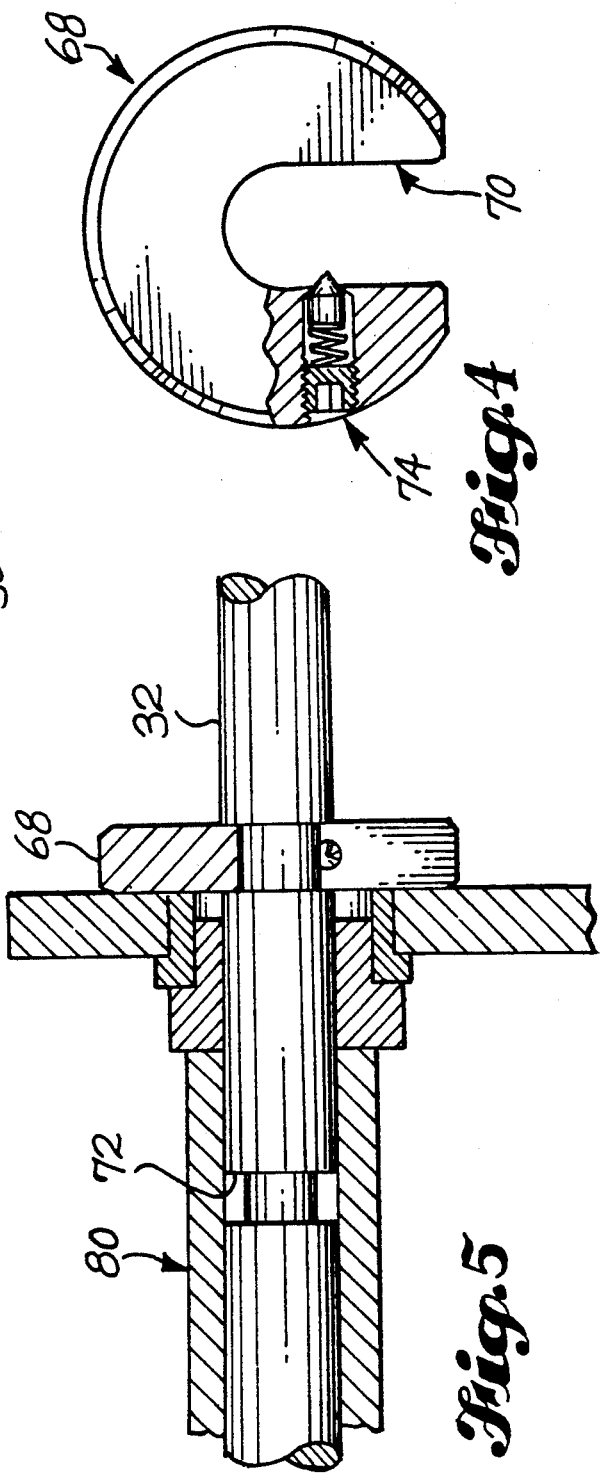

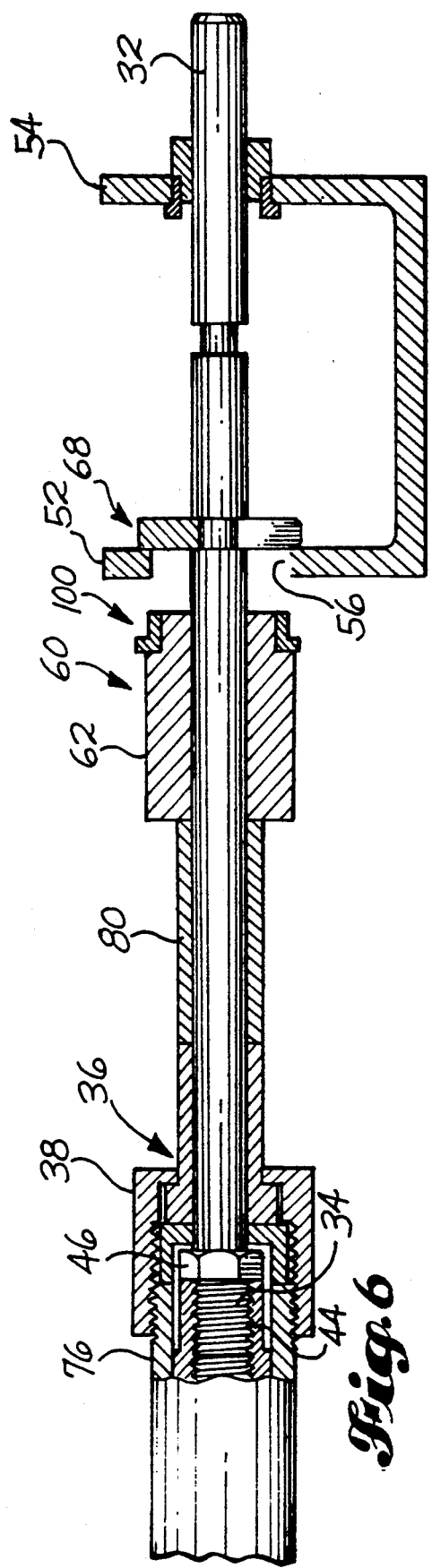
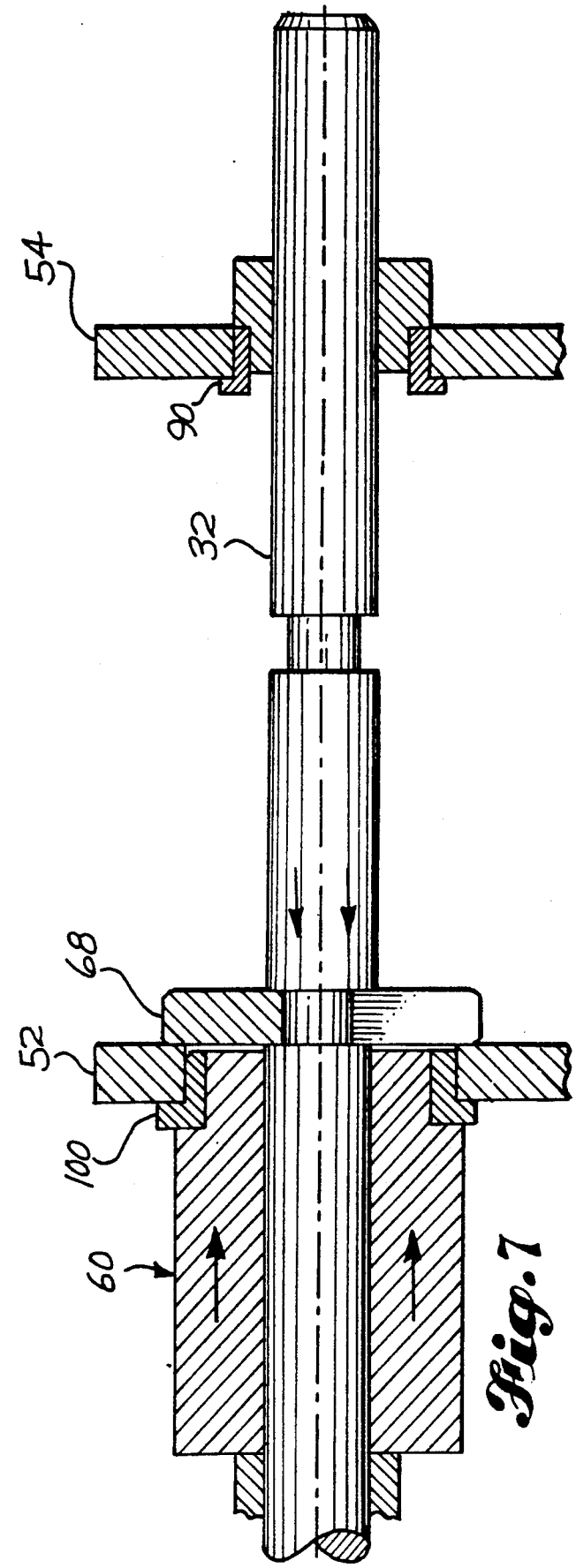

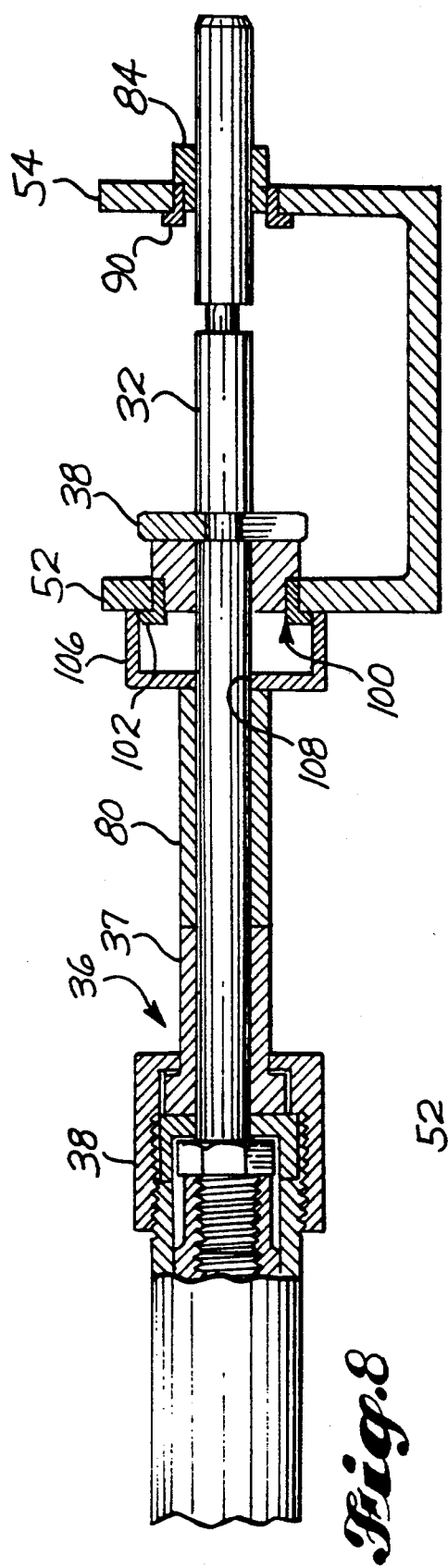
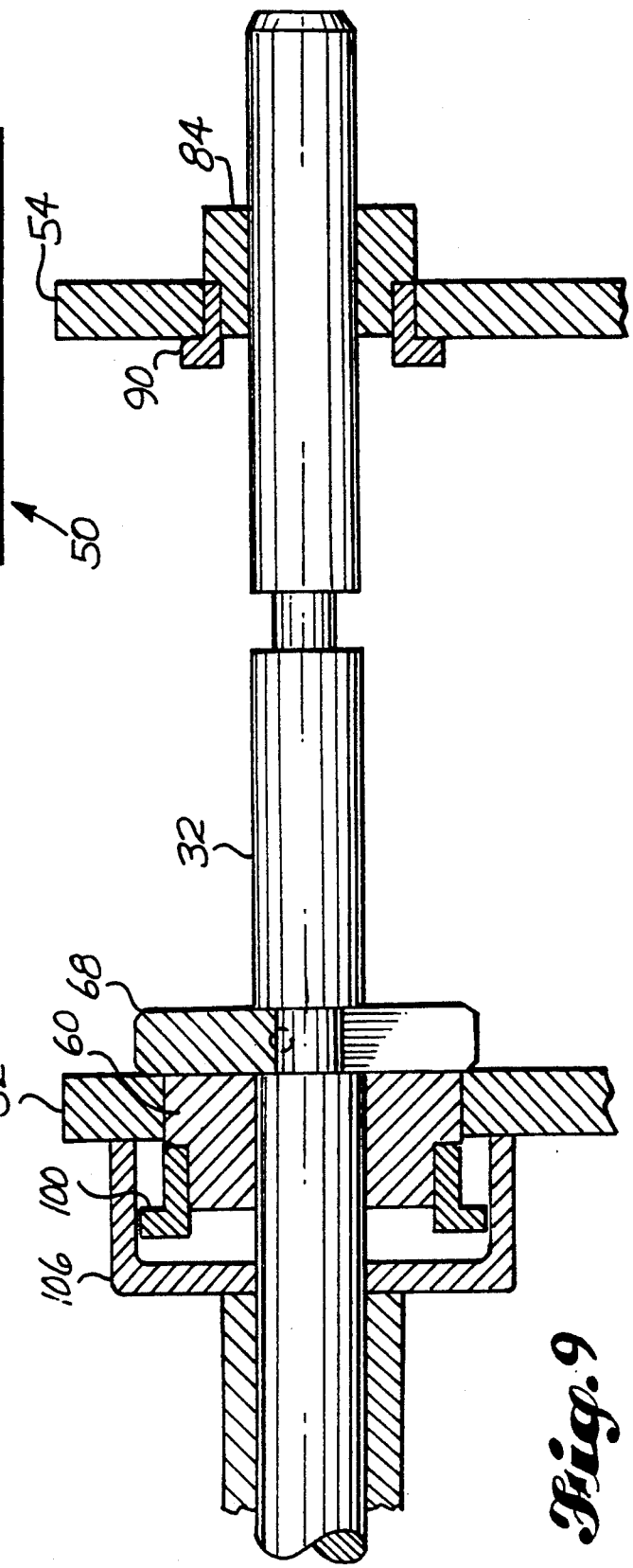
Fig. 8
Fig. 9

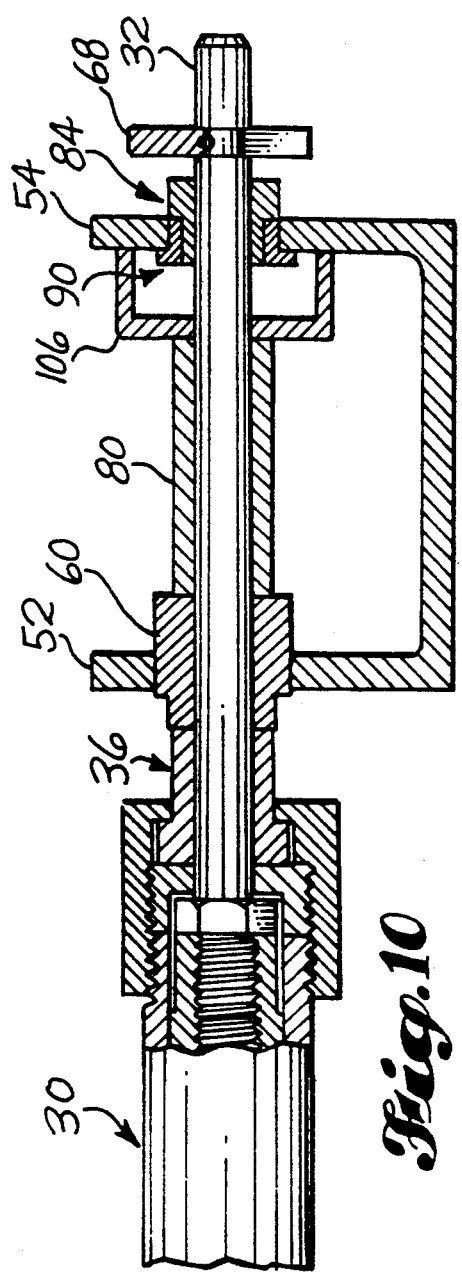
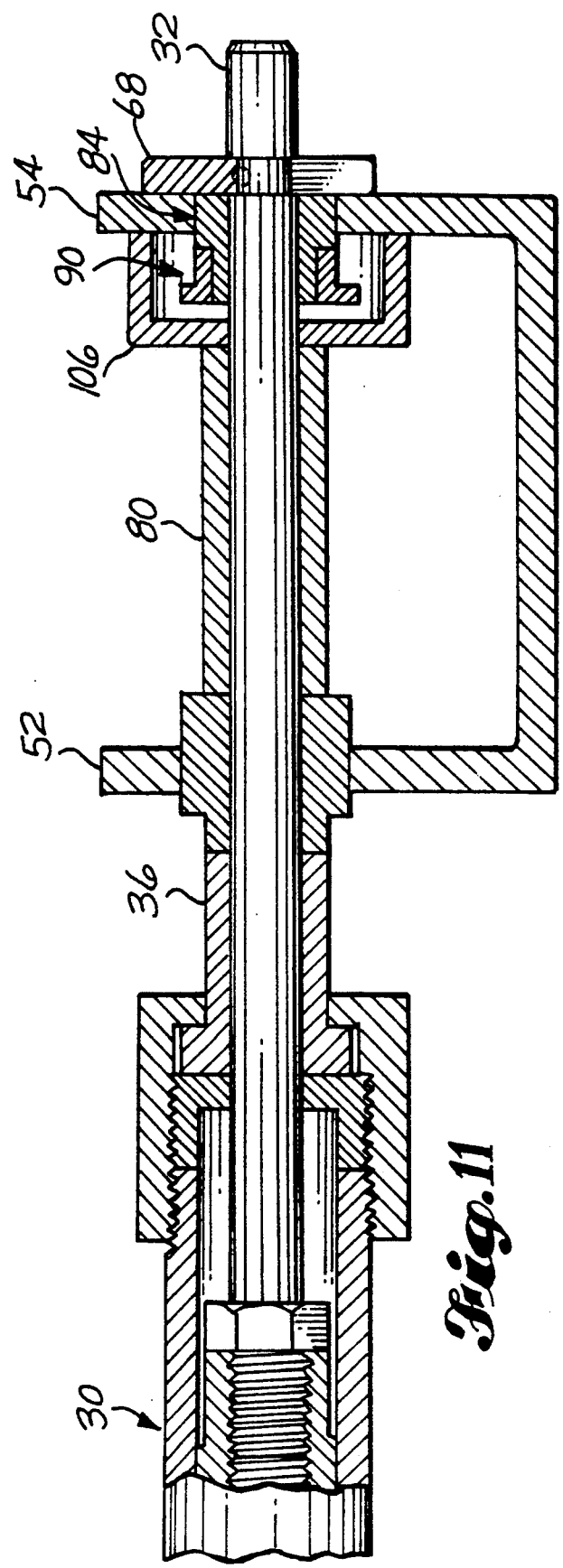

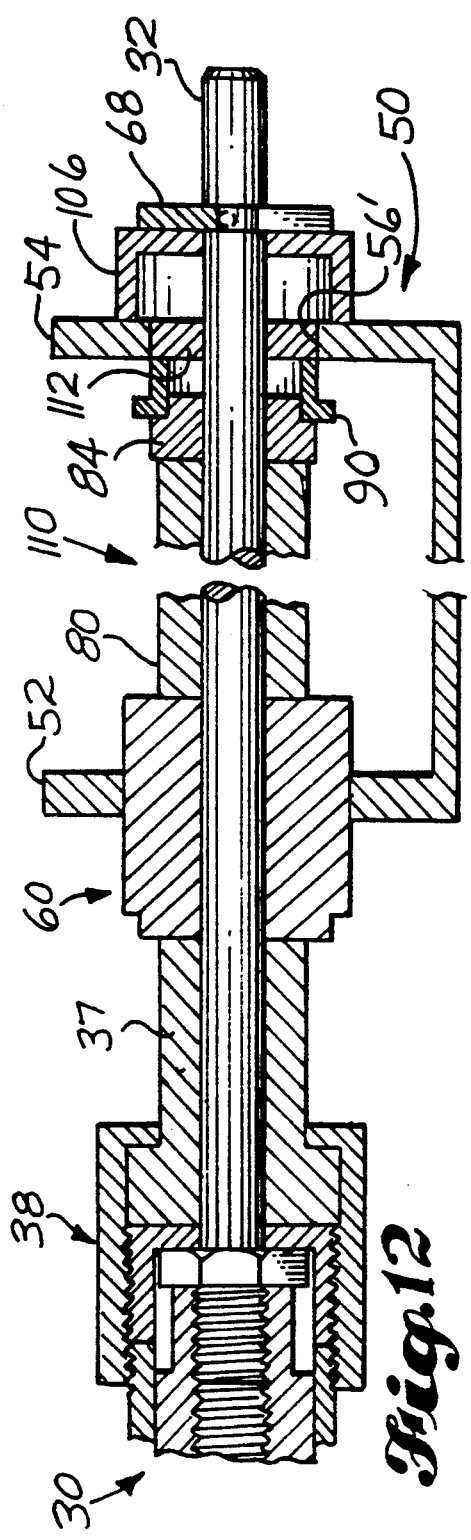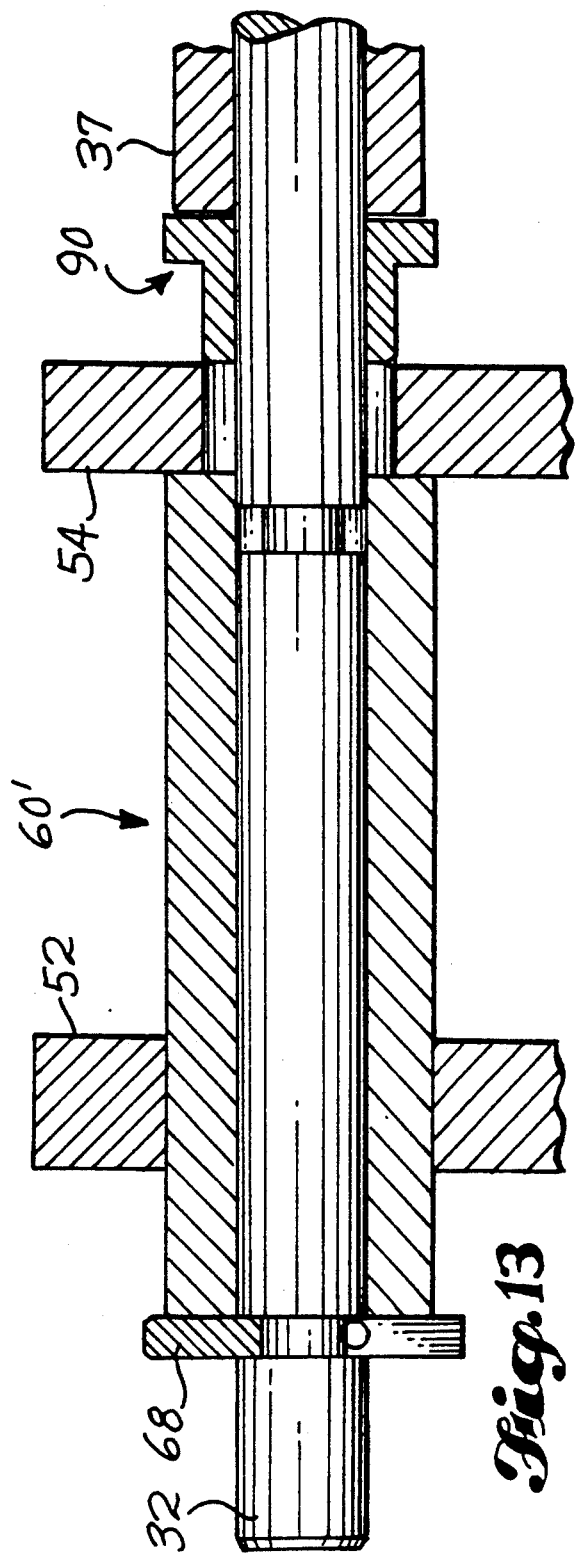

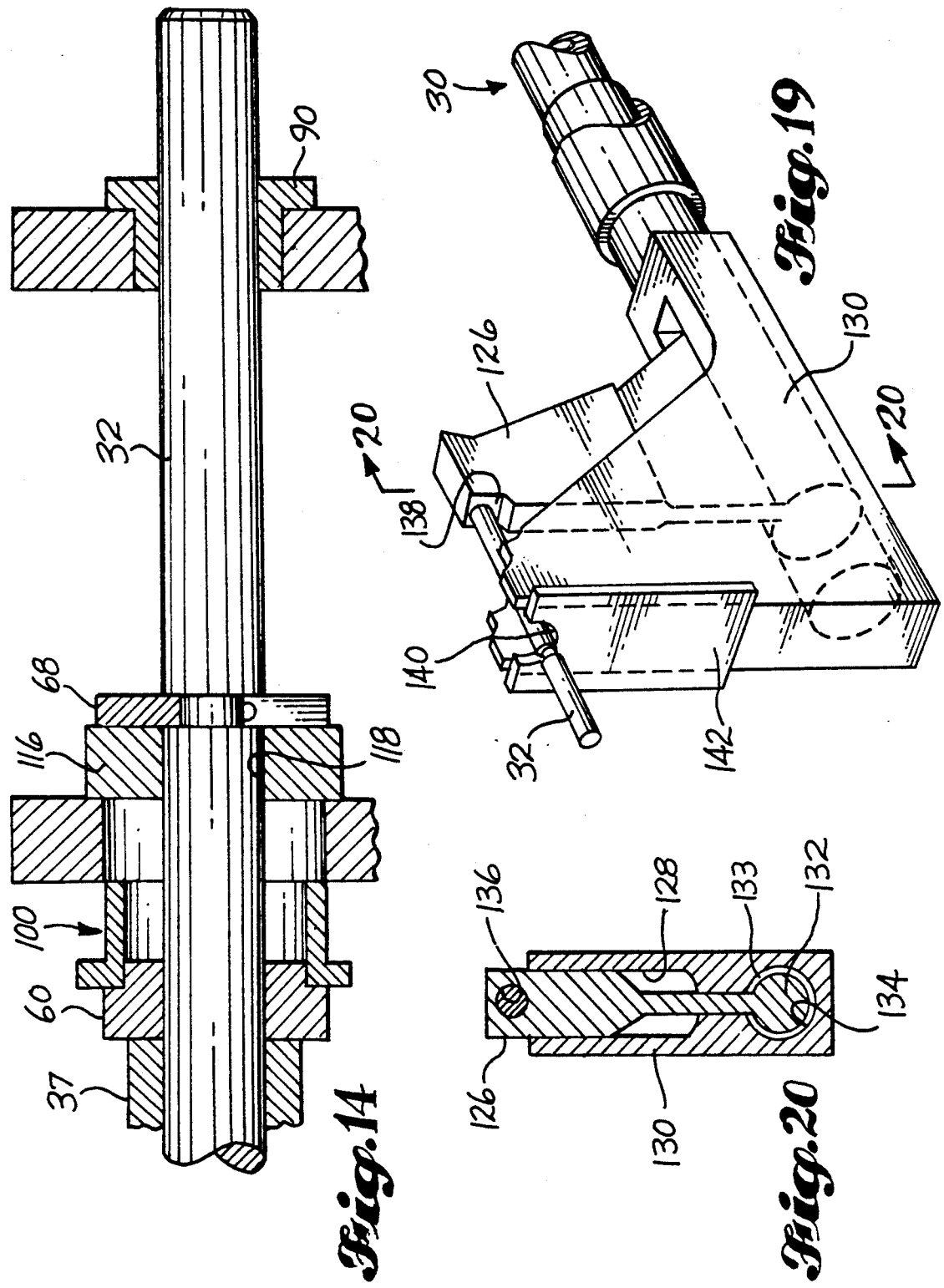

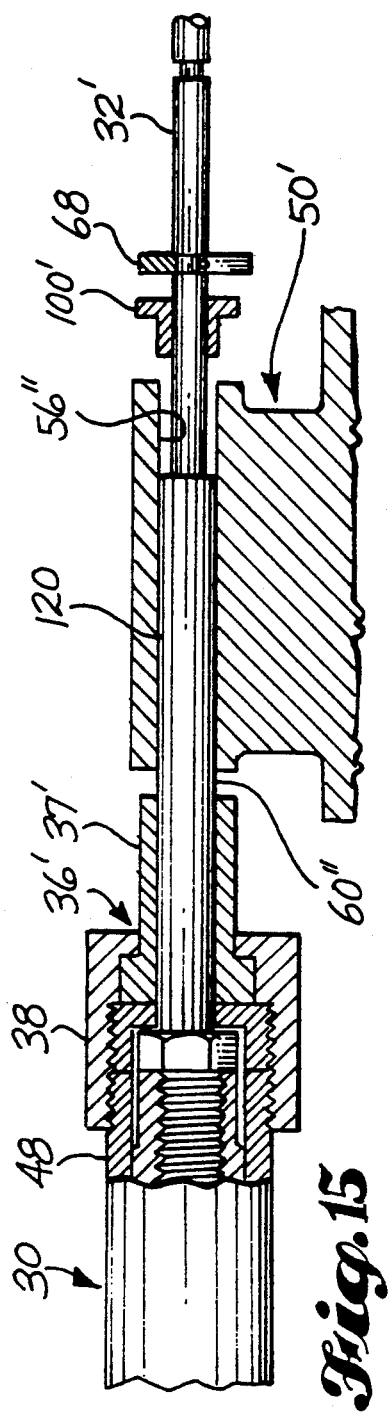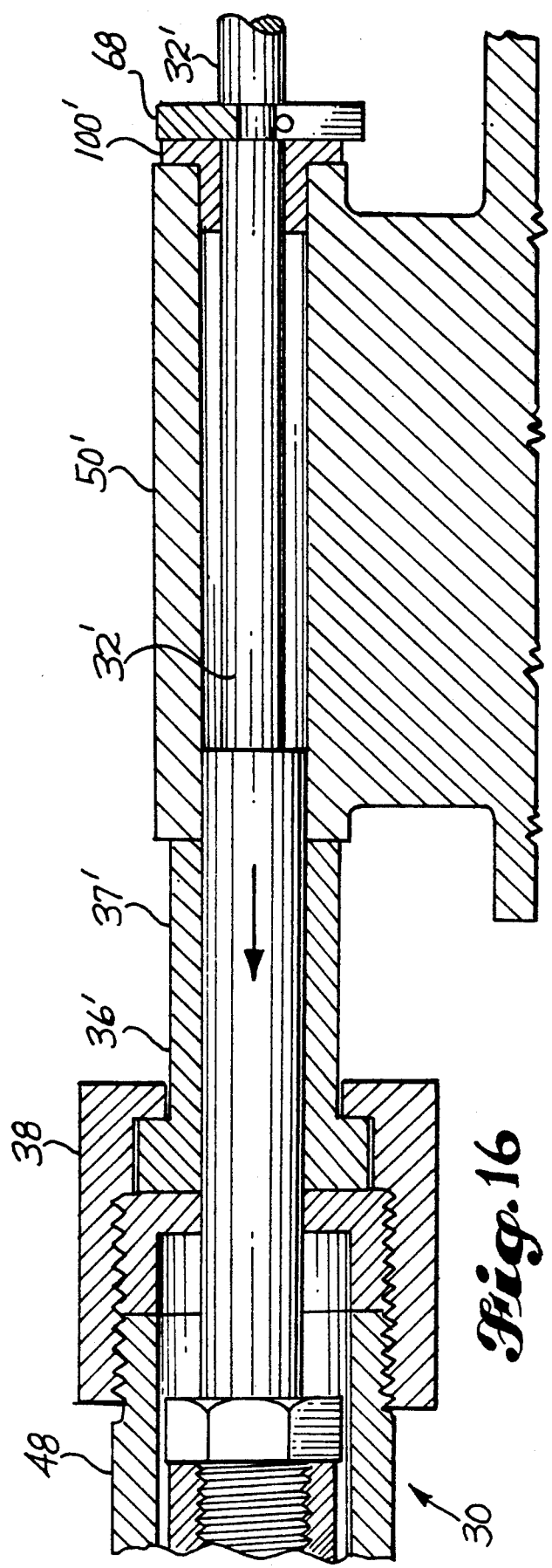

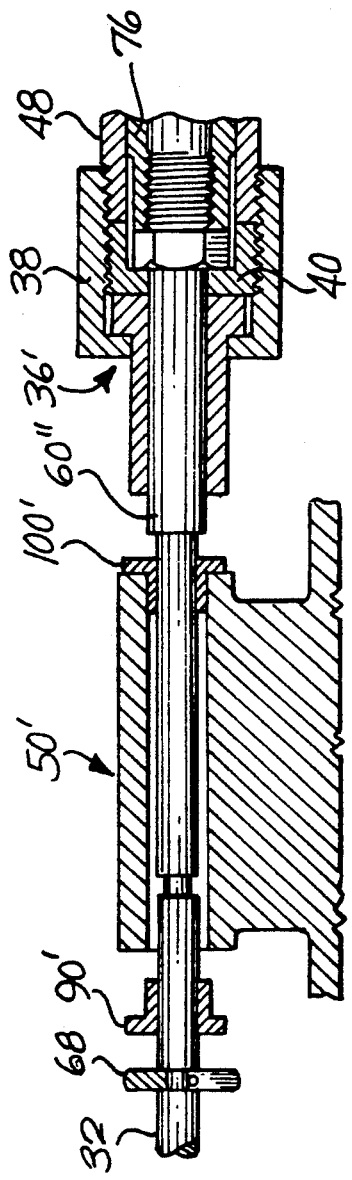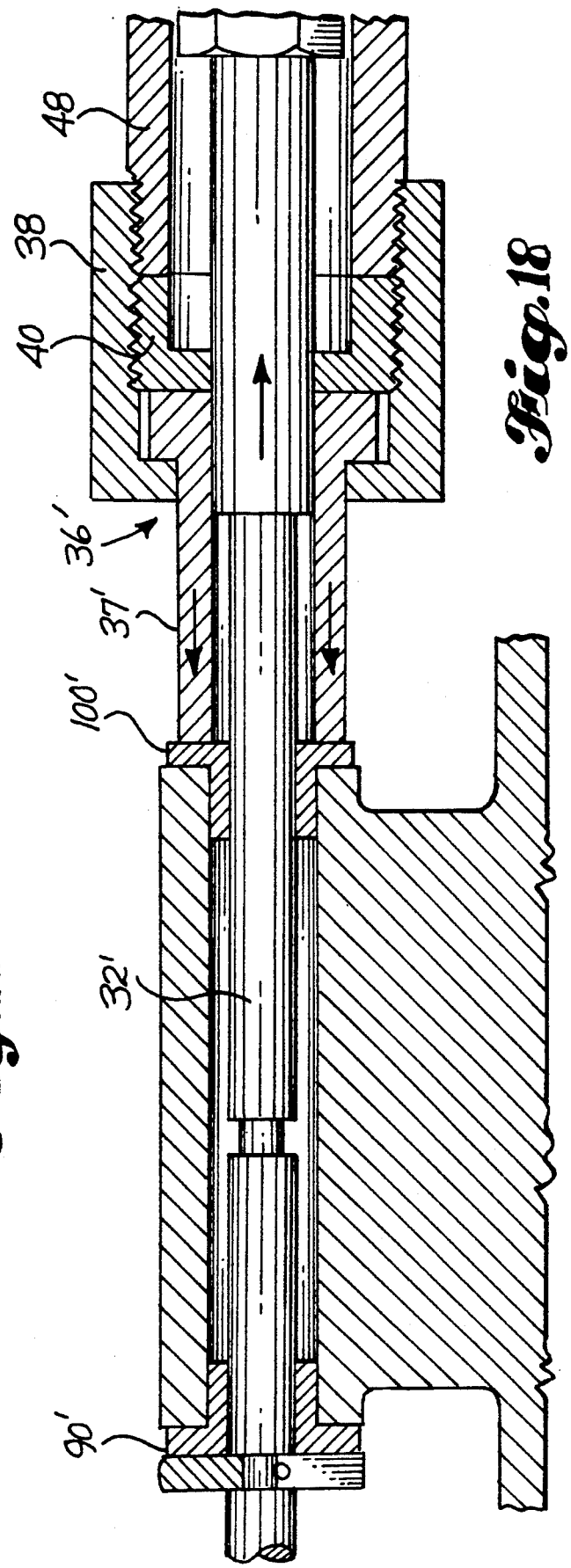

APPARATUS FOR INSTALLING BUSHINGS CONCENTRICALLY IN A BORE

BACKGROUND OF THE INVENTION

This invention relates to installation of bushings in a bore, and more particularly to a method and apparatus for installing two spaced bushings concentrically in the two ends of a bore, coaxially with each other.

In the aerospace and other industries, there has long been a requirement for the mounting of bushings in bores in parts, usually to support a shaft which is mounted in the part for supporting or connection to some other part. An example is a flap assembly which requires the installation of pintel pins. The pintel pins must be installed in the bushings in a clevis flap assembly with a very close tolerance sliding fit, and if the bushings are not concentric in the bore and coaxial with each other, the installation of the pins will be difficult or impossible and require extensive and expensive rework on the part in order to be able to install the pintel pins.

The conventional method of installing bushings in such parts is with the use of a press. The part is positioned on the press platen and spacers are positioned to support the part against deflection when the ram of the press is actuated to press the bushing into the bore. A bushing is positioned at the end of the bore and the part is aligned under the ram of the press, then the press is operated to drive the ram down and press the bushing into the bore.

This system works best when jigs and fixtures are available for positioning the part in the press and aligning the bore and bushing with the press ram. However, in many manufacturing plants where bushings are used, the cost of manufacturing jigs and fixtures for each of the numerous parts that have bushings installed becomes very expensive, especially since each bushing in the part must have a different installation fixture and every revision of the part would usually require a redesign of the fixture. More importantly however, even with the use of jigs and fixtures, the conventional process is imperfect because of the impossibility of maintaining alignment of the bushings with the bore and each other while exerting a pressing force on the bushing during installation which is exactly parallel to the axis of the bore.

When the axis of the bushing is misaligned with the axis of the bore or the direction of force exerted on the bushing during installation, or if the pressing surfaces are nonperpendicular to the axis of the bore, the bushing will not be pressed straight into the bore, but will be cocked slightly and gouge the walls of the bore as it is pressed into the bore, and will be pressed into a slightly skewed position in the bore so that it is nonconcentric with the bore and not coaxial with the other bushing inserted at the other end of the bore. This nonconcentricity and/or noncoaxial orientation prevents or makes difficult the proper installation of the pin, shaft, or bolt through the two bushings, requiring removal of the bushings, reboring of the bore in the part, and reinstallation of oversized bushings in the new bore. This rework adds considerably to the cost of the part and slows the production speed of the manufacturing operation.

One of the principle reasons for using bushings in a bore is that they can be replaced when the bushing becomes worn. This makes it possible to replace only the portion of the part which is worn instead of the entire part, which could be very expensive. However, the replacement of bushings is considerably more difficult in the field than it is in the factory. In the field, the bushings are forced into the bore with whatever tools are at hand, including hammers making correct alignment of the bushings in the bore and with each other unusual and primarily a matter of good luck. Another technique in wide use is to insert a bolt through the bushings and the bore, and tighten a nut on the bolt to force the bushings into the bore. This is preferable to pounding the bushings in with a hammer, but is slow and does not ensure either concentricity or coaxial alignment because there is no guidance for the bushings and nothing to keep the bolt coaxially aligned in the bore.

Various other schemes have been devised to solve this problem, but none of these schemes provides the desirable attributes of low cost, simplicity, speed of operation and flexibility of use with numerous different parts. Thus, there has been a long unfulfilled need in the industry for a simple, reliable, inexpensive and flexible process and apparatus for installing bushings concentrically in a bore in which the bushings are held in exact coaxially alignment with each another during installation so that the installed bushings are properly oriented in the bore and to each other.

SUMMARY OF THE INVENTION

Accordingly, it is an object of this invention to provide an improved method and apparatus for installing bushings concentrically in a bore and coaxially with each other.

It is another object of the invention to provide an improved method and apparatus for installing two bushings in a bore in a part that uses a commercially available apparatus and a minimal amount of special tooling for the application.

It is still another object of the invention to provide an improved method and apparatus for installing bushings in a bore wherein the bushing is aligned with a bore and guided along an exact concentric path in the bore by a mandrel which is supported concentrically within the bore.

It is yet another object of the invention to provide an improved method and apparatus for installing bushings concentrically in a bore that uses simple and inexpensive tooling that does not require extensive training or skill on the part of operators to accomplish consistent high quality bushing installations and very low rejection rates for parts manufactured.

These and other objects of the invention are attained in a method, and an apparatus for performing the method, for installing a pair of bushings in the two ends of a bore in a part, which includes inserting a mandrel and a guide on the mandrel with a close sliding fit, through one end of the bore and installing a bushing on the other end of the mandrel in alignment with the other end of the bore. An anvil bears against the bushing and a collar attached to the mandrel engages the part. A pulling tool fastened to the end of the mandrel pulls the mandrel toward the pulling tool and produces a squeezing force between the anvil and the collar which squeezes the bushing into the bore. A second bushing is pressed into the other end of the bore by aligning the mandrel with the bore through the installed bushing with a close sliding fit and aligning the second bushing on the mandrel with the end of the bore in which it is to be installed. The collar is reinstalled on the mandrel adjacent the other end of the part and the pulling tool is energized to pull the mandrel toward the tool and create a squeezing force between the anvil and the collar to press the second bushing into the other end of the bore. These parts can be rearranged in numerous ways to accommodate various sizes and configurations of parts, but all operate with the same method of aligning the mandrel in the bore using a guide and pressing a bushing into the other end of the bore using a squeezing force exerted by the powered pulling of the mandrel toward the pulling tool, transmitted through the collar to the part, and the reaction force from the pulling tool exerted through the anvil on the bushing.

DESCRIPTION OF THE DRAWINGS

The invention and its many attendant objects and advantages will become more apparent upon reading the following description of the preferred embodiment in conjunction with the following drawings, wherein:

FIG. 3 is a sectional elevation of the apparatus of FIG. 1 set up to install a bushing in one flange of the part;

FIG. 4 is an elevation, partly in section, of the collar shown in FIGS. 1 and 3;

FIG. 5 is an enlarged sectional elevation of the one flange shown in FIG. 3 with the bushing installed;

FIG. 6 is a sectional elevation of the apparatus shown in FIG. 1 set up to install a bushing in the other flange of the part;

FIG. 7 is an enlarged sectional elevation of the other flange shown in FIG. 6 with the bushing installed;

FIG. 8 is an elevation of the apparatus of FIG. 1 set up to extract the bushing from the other flange wherein the bushing was being installed in FIGS. 6 and 7;

FIG. 9 is an enlarged elevation of the other flange shown in FIG. 8 with the bushing extracted.

FIG. 10 is a sectional elevation of the apparatus of FIG. 1 set up to extract the bushing from the one flange wherein it was shown installed in FIGS. 3 and 5;

FIG. 11 is a enlarged sectional elevation of the one flange shown in a FIG. 10 with the bushing extracted;

FIG. 12 is another embodiment of the invention showing the use of a spacer and a dummy bushing for installing the bushing in the far flange of a part;

FIG. 13 is another embodiment showing an elongated primary guide sleeve used to transmit the pulling force of the mandrel on the back side of the flange while the reaction force from the anvil pushes the bushing into the bore;

FIG. 14 is a sectional elevation showing the use of a short spacer to back up the collar when a bushing is to be installed in a large diameter hole;

FIG. 15 is a sectional elevation of a bushing being installed in the remote end of a bore through a solid part;

FIG. 16 is a enlarged sectional elevation of the apparatus and part shown in FIG. 15, with the bushing installed;

FIG. 17 is a sectional elevation of the installation tool and part shown in FIG. 15 with a bushing being installed in the the other end of the bore;

FIG. 18 is an enlarged sectional elevation of the apparatus and part shown in FIG. 17, with the bushing installed in other end of the bore;

FIG. 19 is a perspective view of an offset for use with the pulling tool shown in FIG. 1, used in confined locations; and, FIG. 20 is a sectional elevation through the pulling arm of the offset adaptor shown in FIG. 19.

DESCRIPTION OF THE PREFERRED EMBODIMENT

Figure 1:
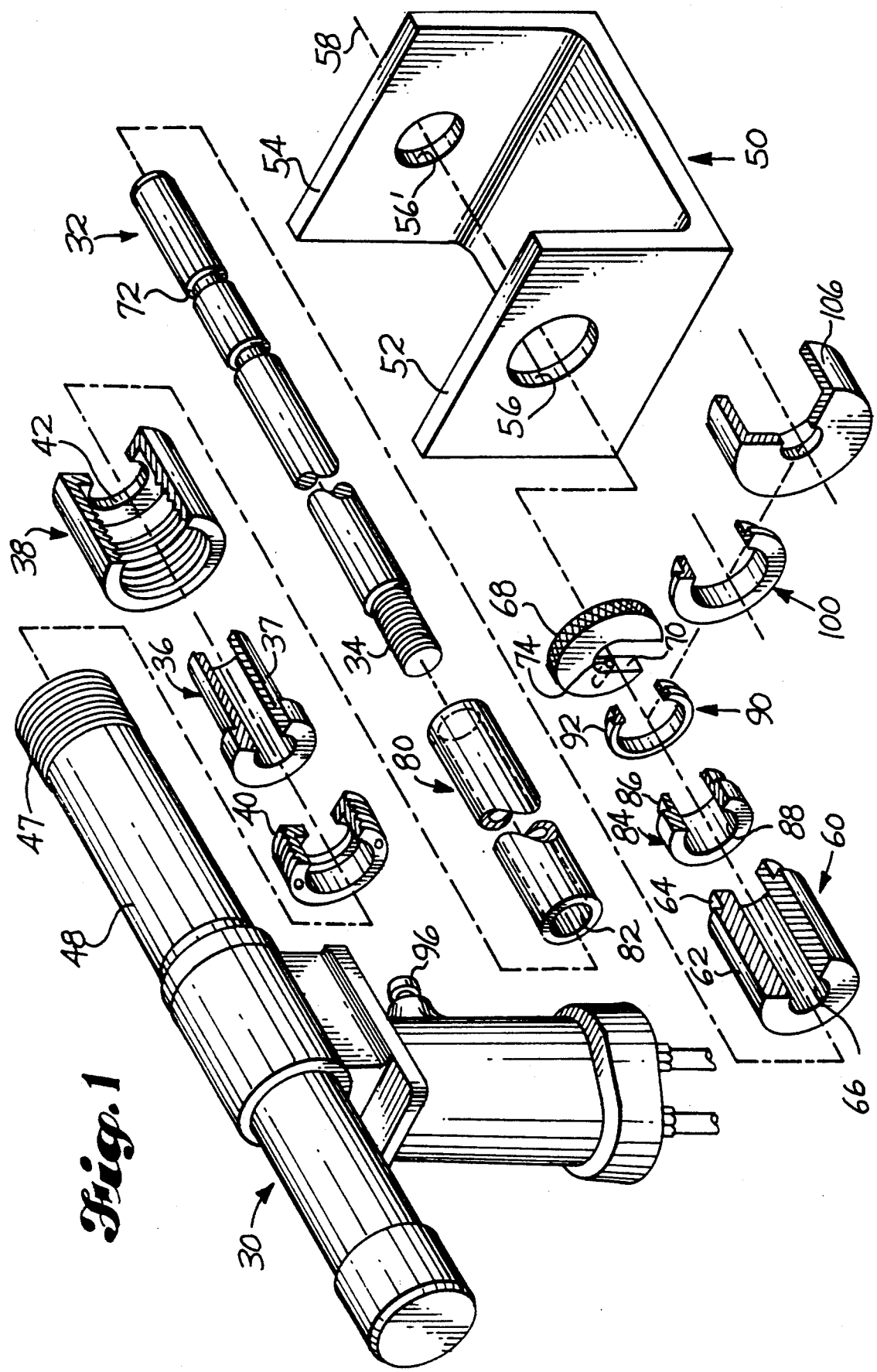
FIG. 1 is an exploded view of an apparatus for performing the method of this invention, and a schematic view of a part and two bushings to be installed in the part by the apparatus.

Referring now to the drawings, wherein like reference characters designate identical or corresponding parts, and more particularly to FIG. 1 thereof, a pulling tool 30 is shown along with a cylindrical mandrel 32 which is connected to the pulling tool 30 at a threaded proximal end 34 of the mandrel 32.

The pulling tool 30 used in this preferred embodiment is a "Little Brute" made by Fatigue Technology, Inc., Seattle, Washington and is shown in U.S. Pat. No. 4,187,780. It is normally used to cold work the walls of a hole in a part by pulling a tapered mandrel through the hole to toughen and harden the metal on the inside of the hole. Another use of this tool is to strain slip fit bushings to expand them to a tight or interference fit in the bore in a part.

Figure 2:
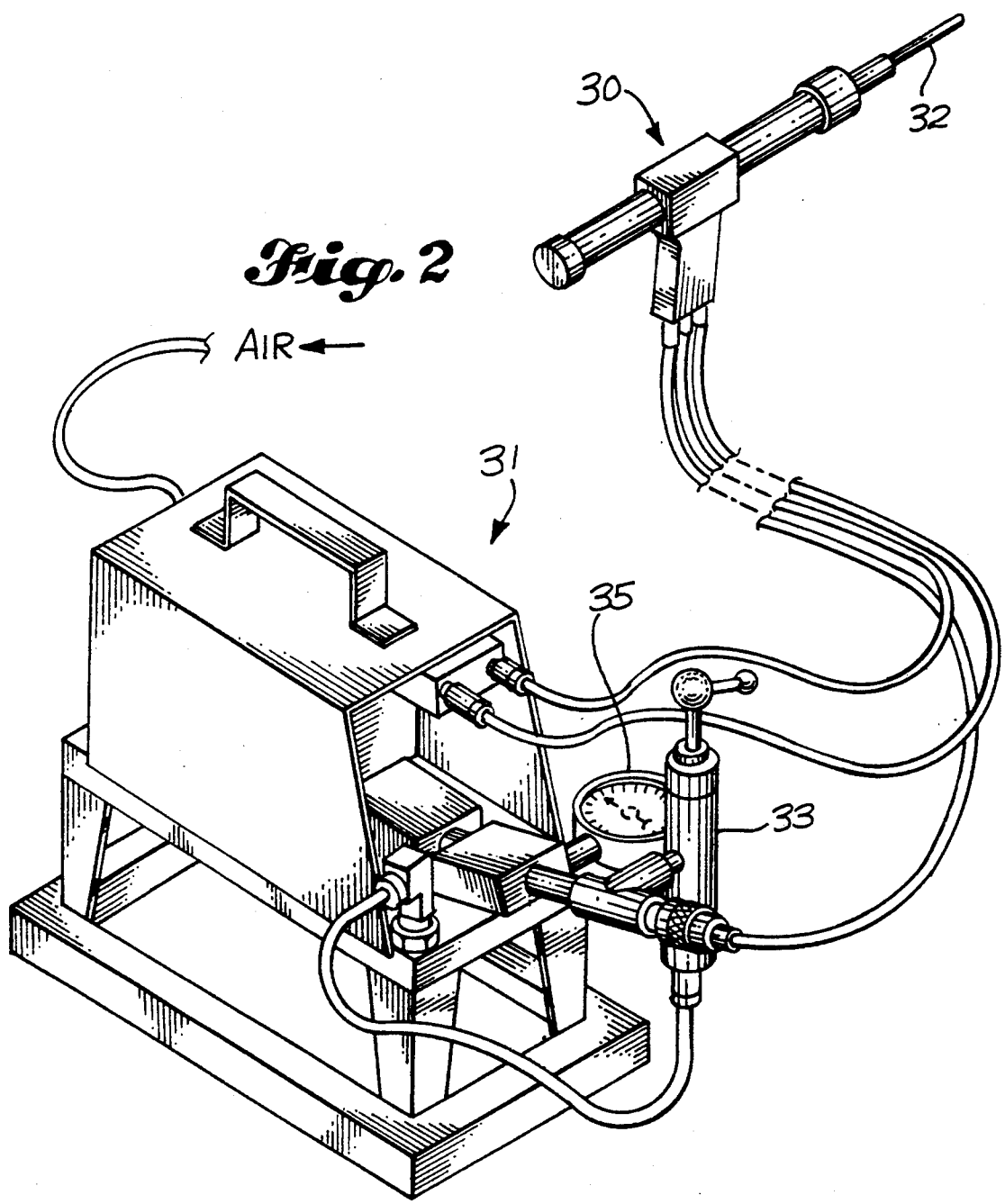
FIG. 2 is a perspective view of the pulling tool shown in FIG. 1 and a power pack for energizing the pulling tool.

The pulling force is exerted by the pulling tool 30 on the mandrel 32 as shown in FIG. 2, by a hydraulically powered piston, utilizing hydraulic pressure generated by a power pack 31 and connected to the tool 30 by suitable hydraulic lines to retract the piston, and air pressure supplied through an air hose to extend the piston. The "Little Brute" tool is capable of exerting a pulling force of 10,000 lbs., but a force of about 1,000 lbs. is adaquate for the use of this tool in this application, so the "Little Brute" is modified with a pressure regulator 33 and a pressure gauge 35 on the tool power pack 31 for easily adjusting and confirming that the hydraulic pressure delivered to the tool 30 is at the desired level.

An anvil 36 is nested into an internally threaded sleeve 38 and is held in that position by an externally threaded ferrule 40. The anvil 36 has a forwardly extending tubular portion 37 which is inserted through a hole 42 in the end of the threaded sleeve 38 and the ferrule 40 is threaded into the threaded sleeve 38 behind the anvil 36 to hold it against the flanged end of the threaded sleeve 38. The threaded proximal end 34 of the mandrel 32 is threaded into a threaded receptacle 44 in the pulling tool and is locked on by a jam nut 46, tightened down to prevent the mandrel 32 from becoming unscrewed during use. The threaded sleeve 38 with the nested anvil 36 has now slid over the mandrel 32 attached to the pulling tool 30, and the threaded sleeve 38 is threaded onto the threaded end 47 of a barrel 48 at the front end of the pulling tool 30. The pulling tool 30 with the attached mandrel 32 and anvil 36 is now ready for use to install bushings in a bore in a part.

A part 50 is shown having two upstanding ribs or flanges 52 and 54. Each rib or flange 52 and 54 has a bore 56 and 56' therethrough aligned on an axis 58. The term "bore" as used herein, is a hole axially aligned in a part for receiving a bushing at one or both ends. The bore can be, as in the case of the part 50, in two separate, spaced structural members 52 and 54, or it can be a single elongated hole through a solid part, as shown in FIGS. 15-18. In either case, the hole lies on a single axis and is intended to receive a bushing at the two spaced ends of the bore. The bore often will have different diameters at its two ends as in the case of the part 50, but the different diameter portions will always be on the same axis. The invention assures that bushings inserted in the two ends of the bore will be concentric in the bore and coaxial with each other.

A primary guide sleeve 60 having a main cylindrical section 62 and a reduced nose section 64 has an axial hole 66 therethrough dimensioned to receive the mandrel 32 with a close sliding fit. The hole 66 is concentric with the outer surface of the cylindrical section 62 and the nose section 64, so that the mandrel 32, when received in the hole 66 is concentric with a bushing mounted on the nose section 64 and with the outer circumference of the cylindrical section 62 and the bore 56 and 56', and lies on the axis 58 of the bore 56 and 56'.

A collar 68 is provided having a radial slot 70 dimensioned to fit into any one of a series of circumferential grooves 72 in the mandrel 32. A spring loaded detent 74, shown in FIG. 4, is mounted in the collar 68 and protrudes into the slot 70 to hold the collar 68 in the groove 72 of the mandrel 32 so that the collar 68 does not fall out of the groove when the collar is inverted.

In operation, the anvil 36 is inserted through the hole 42 in the end of the threaded sleeve 38, and the externally threaded ferrule 40 is screwed down against the end of the anvil 36 with the use of a spanner. The ferrule 40 is not screwed down tight but is lose enough to allow the anvil 36 to float radially within the threaded sleeve 38 so that it can center itself on the mandrel 32 when the mandrel is inserted through the anvil 36.

The mandrel 32 is now inserted into the end of the pulling tool 30 and the threaded end 34 is threaded into the threaded receptacle 44 at the end of a piston 76. The piston is axially retractable under hydraulic pressure as shown in U.S. Pat. No. 4,187,780, the disclosure of which is incorporated herein by reference, so that when the pulling tool is actuated, the mandrel threaded into the threaded receptacle 44 is withdrawn with the piston 76. The jam nut 46 is tightened down against the end of the threaded receptacle 44 to lock the mandrel onto the piston 76. The threaded sleeve 38 and nested anvil 36 are then slipped over the end of the mandrel 32 and the threaded sleeve is threaded onto the threaded end 47 of the barrel 48 of the pulling tool 30.

The primary guide sleeve 60 is slipped onto the mandrel 32, and the mandrel and primary guide sleeve are inserted through the bore 56 in the flange 52. The outside diameter of the primary guide sleeve is a close sliding fit in the bore 56, and is concentric with the axial hole 66 through the guide sleeve 60, so the mandrel 32 is supported in a concentric and coaxial position in the bore 56. A tubular spacer 80 having an axial hole 82 therethrough which is concentric with the exterior circumferential surface of the spacer 80, and which is sized to have a close sliding fit on the mandrel 32, is slid over the mandrel and abutted against the nose of the primary guide sleeve 60. Conveniently, the spacer 80 has the same internal and external dimensions as the tubular portion 37 of the anvil 36.

The process illustrated in FIG. 3 includes first installing the smaller diameter bushing 90 in the portion of the bore 56' in the flange 54. This is done by inserting a secondary guide sleeve 84 onto the mandrel 32 and mounting the bushing 90 on the front end of the secondary guide sleeve 84, which has a step to a smaller diameter portion 86 on which the bushing 90 fits. An axial hole 88 in the secondary guide sleeve 84 is sized to receive the mandrel 32 with a close sliding fit, so the secondary guide sleeve 84 supports the bushing 90 in a coaxial and concentric position relative to the bore 56'. The small diameter bushing 90 has a flange 92 and a cylindrical body portion 94 having an outside diameter slightly larger than the inside diameter of the bore 56'. The distal end of the cylindrical body portion 94 the bushing 90 is chamfered so it tends to center itself in the entrance to the bore 56.

The pulling tool 30 is pushed forward to take up all of the slack between the parts and push the bushing 90 against the entrance to the bore 56'. The collar 68 is slipped onto the groove 72 in the mandrel 32 which is closest to the outside face of the flange 54 and the pulling tool 30 is actuated by pushing one of the buttons 96 which pressurizes a cylinder in the pulling tool and retracts the piston 76 under hydraulic pressure. This creates a squeezing force between the collar 68 and the distal end of the spacer 80 acting on the secondary guide sleeve 84 to push the bushing 90 straight into the bore 56'.

By transmitting the reaction force of the pulling tool 30 through the anvil 36, the primary guide sleeve 60, the spacer 80, and the secondary guide sleeve 84 directly to the bushing 90, the flange 52 is not subjected to any forces of the bushing insertion operation. If the reaction force of the pulling tool 30 had been exerted on the flange 52 and thence through the base of the part 50 to the flange 54, the flanges 52 and 54 could deflect to upset the coaxial alignment of the bore 56 and 56' and thereby alter the concentric orientation of the bushing 90 relative to the bore 56'. Worse yet, the squeezing force exerted between the two flanges 52 and 54 could actually bend them and damage the part 50 beyond repair. By isolating the flange 52 from the reaction force of the tool 30, no bending forces are exerted on the flanges 52 and 54, and the coaxial alignment of the bore 56 and 56' is maintained with the axis of the mandrel 32 so the bushing 90 can be pressed straight into the bore 56' without cocking or gouging the walls of the bore.

Because of the close fit of the primary guide sleeve 60 in the mandrel 32, and the concentric arrangement of those parts with the axial holes through them, the mandrel is maintained in a concentric and coaxial relationship to the bore 56 and 56'. Moreover, the ends of the anvil tubular portion 37, the primary guide sleeve 60, the spacer 80, and the secondary guide sleeve 84 are all ground flat and perpendicular to the axis of the holes through those parts so that the squeezing force exerted by the secondary guide sleeve 84 on that bushing 90 is exactly parallel to the axis of the mandrel 32 so the bushing 90 is guided straight into the bore 56 without the possibility of assuming a canted orientation which would cause the bushing to gouge the walls of the bore 56 as it is pressed into position. Likewise, the face of the collar 68 is ground flat and perpendicular to the axis of the curved end of the slot 70 s that the force exerted by the mandrel 32 through the collar 70 on the outside face of flange 54 is also exactly parallel to the axis of the mandrel 32. The bushing 90 is thus maintained in the proper orientation throughout the entire pressing operation so it never has an opportunity to tilt to a nonparallel position and instead is guided straight into the bore 56' and is seated with this flange 92 against the inside face of the flange 54 in an exactly concentric position in that bore 56 and coaxial to the axis 58 through the bore 56 and 56', as shown in FIG. 5.

To install a bushing in the bore 56 in the flange 52, the collar 68 is removed from its groove 72 in the mandrel 32 and the mandrel is slid out of the space 80 and the primary guide sleeve 60. The spacer 80 can now be laid aside or, if needed to put a groove 72 in the right position, can be slipped onto the mandrel 32 as shown in FIG. 6. The primary guide sleeve 60 is slid onto the mandrel 32 with a large diameter bushing 100 nested on the reduced nose section 64 of the primary guide sleeve 60. The mandrel 32 is held in a coaxial and concentric position in the bore 56 and 56'. The nose end of the bushing 100 is slightly chamfered to facilitate centering of the bushing 100 in the opening into the bore 56. The collar 68 is slipped onto the groove 72 nearest the inside face of the flange 52 and the pulling tool 30 is actuated by pressing the button 96 to pressurize the piston 76 and pull the mandrel 32 toward the pulling tool 30. The reaction force exerted by the pulling tool 30 is transmitted through the anvil 36 and the primary bushing 60 to the bushing 100, and the pulling force exerted by the pulling tool 30 is transmitted through the mandrel 32 to the collar 68 and against the inside face of the flange 52 to squeeze the bushing 100 into the bore 56. As before, the direction of the force exerted by the pulling tool is exactly parallel to the axis of the mandrel and the faces of the elements engaged with the bushing 100 and the flange 52 are exactly perpendicular to the axis of the mandrel 32 so the bushing is guided concentrically straight into the bore 56 without being afforded the possibility of tilting off axis so there is no chance for the bushing to gouge the walls of the bore 56 as it is pressed in place, and the bushing 100 is maintained in an exactly parallel orientation to the axis of the mandrel 32 as it is pressed into the bore 56.

FIG. 7 shows the bushing 100 in its seated position in the bore 56 with the flange seated against the outside face of the flange 52 and the bushing 100, along with the bushing 90 seated in the bore 56 and 56' in an exactly concentric and coaxial position.

When it is desired to remove the bushings 90 and 100 from the bore 56 and 56', the same tools plus one additional element can be used to gently extract the bushing from the bore without damage to the bore so that a new bushing may be reinserted and will align exactly with the other bushing or a new replacement bushing in place of the other bushing. A worn bushing is extracted, as shown in FIGS. 8 and 9, with the use of a cup 106 having an inside diameter slightly larger than the outside diameter of the flange 102 of the bushing 100. The cup 106 is used with the primary guide sleeve 60, which is turned around and its reduced nose section 64 is inserted into the bushing 100 from the end opposite the flange 102. If necessary because of the dimensions of the parts, the spacer 80 may be slid onto the mandrel 32 as shown in FIG. 8 and the mandrel 32 is slid through an axial hole 108 in the closed end of the cup 106 and through the primary guide sleeve 60, and then is slid through the secondary guide sleeve 84 in the bushing 90. The mandrel is supported axially in the bore 56 and 56' by the secondary guide sleeve 84 and the primary guide sleeve 60 so that axial forces exerted by the mandrel are exactly parallel to the axis 58 of the bore 56 and 56'.

The distal end of the tubular portion 37 of the anvil 36 presses the spacer 80 against the closed end of the cup 106 as shown in FIG. 8, and the collar 68 is slipped onto the groove 72 in the mandrel 32 closest to the end of the primary guide sleeve 60. The pulling tool is energized to retract the piston 76 and pull the mandrel 32 through the anvil 36 to exert a squeezing force between the anvil 36 (transmitted through the spacer 80 and the cup 106 to the flange 62) and the collar 68 exerted on the primary guide sleeve 60 acting on the nose end of the bushing 90. The force of the primary guide sleeve 60 acting on the bushing smoothly extracts it from the bore 56 and pushes the bushing 90 into the cup 106, as shown in FIG. 9. The collar 68 is then removed from the mandrel 32 and the mandrel is pulled out of the secondary guide sleeve 84, taking the primary guide sleeve 60 and the bushing 100 along with it. The bushing and primary guide sleeve 60 are then removed from the mandrel 32 and the old bushing 100 is discarded, and a new bushing 100 is installed in the bore 56 in the manner discussed in connection with FIGS. 6 and 7.

As will be apparent from the above description of the removal of the bushing 100, the removal of the bushing 90 is similar. The anvil 36, the primary guide sleeve 60, and the spacer 80 are slid onto the mandrel 32, and the assembly is slid through the bore 56. The cup 106 is slid onto the mandrel with its open end facing the flange 54, and the end of the mandrel is inserted through the bushing 90. The nose end of the secondary guide sleeve 84 is installed into the nonflanged end of the bushing 90 as shown in FIG. 10. The collar 68 is slipped into a groove 72 closest to the secondary guide sleeve 84, and the pulling tool is energized to retract the piston 76 into the gun pulling the mandrel through the anvil 36. This generates a squeezing force between the collar 68 and the cup 106, which squeezing force is exerted on the bushing 90 to extract the bushing from the bore and push it into the cup 106 in a manner similar to that illustrated for the bushing 100 in FIG. 9. The mandrel is then extended by pushing the other button on the pulling tool 30 and removing the collar 68 to enable the mandrel 32 to be withdrawn from the secondary guide sleeve 84 and the cup 106. The extracted bushing 90 is then discarded and a new bushing 90 is installed in the manner discussed already in connection with FIG. 3.

Turning now to FIG. 12, an additional use for the extractor cup 106 is illustrated. If it is desired to provide additional alignment of the mandrel 32 in the bore 56 and 56' through the part 50, especially when the flanges 52 and 54 are widely separated as indicated by the break line 110 between the flanges 52 and 54 in FIG. 12, a dummy bushing 112 can be inserted in the bore 56' having an outside diameter that is a close sliding fit with the inside diameter of the bore 56', having an inside diameter with a close sliding fit with the outside diameter of the mandrel 32. The hole through the dummy bushing 112 is concentric with the outside diameter of the dummy bushing 112 and therefore the mandrel 32 inserted in the hole in the dummy bushing 112 is supported coaxially within the bore 56' when the dummy bushing 112 is in place. The bushing 90 is fitted onto the nose of the secondary guide sleeve 84 and is slid onto the mandrel 32 in front of the spacer 80 and the primary guide sleeve 60. The cup 106 is slid onto the mandrel 32 on the other side of the flange 54 and the collar 68 is inserted over the closest groove 72 in the mandrel to the cup 106. The pulling tool 30 is then energized to retract the mandrel 32 into the pulling tool, pulling on the collar 68 and reacting through the anvil 36, the primary guide sleeve 60, the spacer 80, and the secondary guide sleeve 84 with a pushing force on the bushing 90. This pushes the bushing 90 into the bore 56', pushing the dummy bushing 112 out of the bore 56' into the cup 106. This scheme provides positive alignment of the mandrel 32 at both bores 56 and 56' for enhanced alignment control.

Turning now to FIG. 13, another embodiment of the invention is shown having an elongated primary guide bushing 60' extending through the large diameter portion of the bore 56 through the flange 52 and all the way across the space between the flanges 52 and 54, abutting against the flange 54. The pulling force exerted by the mandrel 32 as it is withdrawn into the pulling tool 30 (not shown in FIG. 13) is exerted by the mandrel 32 through the collar 68 onto the primary guide sleeve 60', where it is exerted against the inside face of the flange 54. The reaction force exerted by the pulling tool 30 is transmitted through the anvil tubular portion 37 directly on the bushing 90 to push the bushing directly into the bore 56'.

When the bushing 90 is seated in the bore 56', the other button on the pulling tool is pressed to relieve the force on the mandrel 32 and the collar 68 is removed, allowing the mandrel 32 to be withdrawn from the primary guide sleeve 60' and the part 50. The pulling tool is now reversed in direction so that the mandrel 32 may be inserted from the side of the flange 52, as shown in FIG. 14. First, a guide sleeve 60 is inserted on the mandrel 32 and the bushing 100 is mounted on the reduced nose section of the primary guide sleeve 60. The mandrel 32 is then inserted through the bore 56 of the flange 52 and a short spacer 116 having an axial hole 118 is slipped onto the mandrel 32. The mandrel is then passed through the bushing 90, which was installed in the last step to ensure alignment of the mandrel with the axis of bore 56 and 56'. A collar 68 is mounted in the groove 72 closest to the short spacer 116 to transmit the pulling force on the mandrel 32 through the collar 68 to the spacer 116. Since the inside diameter of the bushing 90 is a close sliding fit to the mandrel 32, the mandrel is maintained in a coaxial concentric relationship to the bore 56 and 56' so the bushing 100 is aligned coaxially with the bore 56. The pulling tool is energized to cause the mandrel 32 to be pulled toward the pulling tool, the reaction force of which is exerted through the tubular portion 37 of the anvil which bears against the primary guide sleeve 60 to push the bushing 100 straight into the bore 56. The short spacer 116 reduces the overturning moment that would otherwise be exerted by the inside face of the flange 52 around the marginal regions of the bore 56 on the extreme radial regions of the collar 68 which could tend to magnify the stress on the mandrel 32. Instead, the forces exerted between the collar 68 and the mandrel 32 are almost entirely shear forces, which lengthens the service life of the mandrel 32.

Turning now to FIG. 15, another embodiment of the invention is shown for installing bushinqs in the two ends of a single continuous bore 56" through a solid part 50'. In this embodiment, the mandrel 32' has an integral primary guide sleeve 60" formed as an integral part of the mandrel 32'. The tubular portion 37' of the anvil 36' is dimensioned to receive the enlarged diameter portion 60" of the mandrel 32' with a sliding fit so that the mandrel 32' can be pulled by the pulling tool 30 through the anvil 36' to exert a pulling force transmitted through the collar 68 on the bushing 100'. The mandrel 32' is otherwise similar to the mandrel 32 and includes the same threaded connection 34 at its proximal end for connection to the piston 76 of the pulling tool 30.

After the bushing 100' is installed as shown in FIGS. 15 and 16, the collar 68 is removed and the mandrel 32' is withdrawn from the installed bushing 100' and the bore 56". The pulling tool is turned around and inserted as shown in FIG. 17, is from the other direction through the installed bushing 100 and through the bore 56" in the part 50'. Depending on the length of the bore 56", it may be necessary to install a longer anvil 36' for installing the bushing 90', or alternatively to use a mandrel with a shorter enlarged section 60" since the primary guide sleeve 60" is not used for the installation of the second bushing 90'.

With the mandrel 32' inserted through the installed bushing 100' the second bushing 90' is inserted onto the end of the mandrel 32' protruding through the end of the bore 56", and the collar 68 is fitted onto the closest groove 72 in the mandrel 32'. The pulling tool is now energized and, by virtue of the alignment of the mandrel 32' by the bushing 100' in the bore 56", the pulling force exerted by the pulling tool on the mandrel 32' and transmitted to the bushing 90' by the collar 68 is a straight axial force on the bushing 90' to pull the bushing 90' straight into the bore 56".

The bore 56" in the part 50' must, in some applications, be sealed against intrusion of water or other contaminants to prevent corrosion from occurring in the bore 56" over an extended period of use. For this purpose, a sealant is applied in the bore 56" prior to installation of the bushing 100'. The mandrel 32' is inserted into the bore, and the integral primary guide sleeve portion 60" is inserted as shown in FIG. 15 to guide the mandrel 32' and maintain it in a concentric position in the bore 56". To prevent the primary guide sleeve portion of the mandrel 32' from pushing all of the sealant in the bore 56" to the end of the bore in which the bushing 100' will be inserted and thereby leave no room into which the bushing can be inserted, three flats 120 are milled onto the surface the section 60" of the mandrel 32' extending the full length of the section 60". These flats 120 prevent the extrusion of the sealant from the bore 56" and provide a relief path for any sealant that is trapped between the inner end of the bushing 100' and the shoulder formed by the section 60" of the mandrel 32'.

In bushing installations in which the space adjacent the bore 56 is too confined to accommodate the full length of the tool 30, an offset adaptor 124 shown in FIGS. 19 and 20 may be used. The offset adaptor 124, available from Fatigure Technology, Inc., is connected to the tool 30 and has an offset arm 126 pulled by the pulling tool 30 which provides the pulling force for the mandrel. The mandrel shown in FIG. 19 is the mandrel 32' but other mandrel designs could also be used with the offset adaptor 124. The offset adaptor arm 126 slides in a channel 128 formed in the body 130 of the offset adaptor 124. The torque on the arm 126 created by the offset forces exerted on the arm 126 by the mandrel 32' and the piston 72 of the pulling tool 30 is reacted on the body 130 by a cylindrical base 132 on the bottom of the arm 126 which runs in a cylindrical bore 134 in the body 130 below the channel 128. A replaceable slip fit brass bearing sleeve 133 lines the bore 134 to prevent wear to the base 132 or the walls of the bore 134.

In operation, the threaded end 34' of the mandrel 32' is threaded into a threaded bore 136 in the end of the arm 126, and the jam nut 46 is tightened down against the face of a vertical notch 138 machined into the end of the arm 126 to receive the jam nut 46. The forward portion of the mandrel 32 lies in a U-shaped notch 140 in the upper end of an anvil plate 142 attached to the front end of the offset adaptor 124.

The use of the apparatus to insert and extract bushings with the offset adaptor 124 is the same as has been described above, except that the axis of the mandrel 32' is now offset from the axis of the tool 30, and the anvil plate 142 now serves the function of the anvil 36 in the foregoing embodiments of the invention.

The use of this offset adaptor is particularly useful in bushing extraction and replacement in the field where removal of the part from the airplane or other structure is very time consuming and causes expensive down time for the equipment. By enabling this bushing extraction and replacement method to be used on parts that are still mounted on the equipment on which they are used, it is possible to replace bushing in the field very quickly and with alignment quality equal or superior to that of the original equipment alignment quality. The speed an quality of installation made possible by this method quickly pays for the cost of the equipment. Moreover, the excellent alignment quality made possible by this invention on replacement bushings greatly lengthens their life compared to the life of bushings installed by the old prior art hand system. The service life of a pair of bushings in a bore is greatly effected by the alignment of those bushings since misalignment will rapidly cause wear of the bushing or of the shaft, pin, or bolt mounted in the bushings. By installing the bushings in concentric and coaxial relationship in the bore 56, their service life is greatly extended and frequent replacement because of accelerated wear is made unnecessary, hence a great savings in use of the equipment is achieved because of reduced down time.

Obviously, numerous modifications and variations of the embodiments of the invention described herein will occur to those skilled in the art in view of this disclosure. The several embodiments described are merely illustrative of the many different configurations and arrangements of the parts described and the parts will commonly be rearranged or made to different dimensions to accommodate the dimensions of the part in which the bushings are to be installed. Accordingly, it is expressly to be understood that these variations and modifications, and the equivalents thereof, may be practiced while remaining within the spirit and scope of the invention as defined in the following claims, wherein we claim:

We claim:

1. A device for pressing a bushing into or out of a bore, comprising:
    a mandrel having an axis and a coupling attached to said mandrel at one end thereof;
    a pulling tool having a member which is forcably retractable and which has a corresponding coupling for operatively connecting said mandrel to said retractable member, so that actuation of said pulling tool retracts said member and pulls said mandrel along its axis in a direction parallel to the stroke of said retractable member;
    an anvil having an axial passage therethrough, said axial passage sized to receive said mandrel, said anvil having a flat face lying perpendicular to the axis of said mandrel to exert an axial force in reaction to said pulling force exerted by said pulling tool member;
    a primary guide sleeve disposed around said mandrel and having an outside diameter sized to fit snugly into said bore and maintain said mandrel in a coaxial position within said bore;
    a collar attachable to said mandrel at at least one position therealong and having a flat face lying normal to the axis of said mandrel when said collar is attached to said mandrel to transmit said axial force exerted by said pulling tool member on said mandrel to structure in contact with said collar;
    whereby said bushing is pressed straight into or out of said bore by an axial squeezing force exerted between said flat, perpendicular face of said collar and said anvil when said pulling tool pulls said mandrel along its axis through said passage in said anvil.

2. A device as claimed in claim 1, wherein:
    said primary guide sleeve is integral with said mandrel.

3. A device as claimed in claim 1, wherein:
    said primary guide sleeve has an axial hole therethrough sized to slidably receive said mandrel.

4. A device as claimed in claim 3, wherein:
    said collar has a U-shaped opening therein sized to be slidably received in an annular groove in said mandrel;
    whereby said collar can be easily inserted and removed from said groove and, when inserted, transmits the axial force exerted by said mandrel, as it is being pulled toward said pulling tool, which, together with a reaction force exerted by said anvil, produces said squeezing force.

5. A device as claimed in claim 4, further comprising:
    a spring loaded detent mounted in said collar and protruding into said U-shaped opening to engage said mandrel and retain said collar on said mandrel when said collar is inverted.

6. A device as claimed in claim 3, wherein:
    said primary guide sleeve has a reduced diameter end sized to fit snugly into an axial passage through a second bushing, whereby said primary guide sleeve, after use as a guide sleeve to insert a bushing at one end of said bore, may be used to insert said second bushing at the other end of said bore.

7. A device as claimed in claim 1, further comprising:
    a secondary guide sleeve having a portion with an outside diameter sized to fit within a hole through a second bushing with a close sliding fit, and having an axial hole sized to receive said mandrel with a close sliding fit;
    whereby said mandrel may be inserted into said secondary guide sleeve to align said mandrel with said bore when a second bushing is to be installed in the other end of said bore.

8. A device as claimed in claim 1, further comprising:
    a cup for installation on said mandrel adjacent one end of said bore, said cup having an open end facing the end of said bore in a flange and a closed end with an axial hole therethrough for receiving said mandrel;
    whereby said cup provides for transmission of force against said flange while allowing whatever is in said bore to be pushed out of said bore from the other side of said flange into said cup.

9. A device as claimed in claim 8, further comprising:
    a dummy bushing having an outside diameter sized to fit into said bore and an inside diameter sized to receive said mandrel, said dummy bushing supporting the end of said mandrel in the end of said bore opposite to the end of said bore in which said primary guide sleeve lies.

10. A device as claimed in claim 1, further comprising:
- an offset adapter having a connector for attachment to said pulling tool and an arm slidably mounted in a body;
- an anvil plate mounted on the front end of said body for operatively bearing against said part or said bushing to transmit reaction force from said pulling tool in opposition to the pulling force exerted by said mandrel;
- a connector for connecting said mandrel to the end of said arm to enable said arm to pull said mandrel at an offset position from said pulling tool; and
- a guide in said body for receiving a sliding portion of said arm to react the overturning moment exerted on said arm by the offset forces exerted thereon by said mandrel and said pulling tool.

11. A device as claimed in claim 1, further comprising:
- a power pack for generating hydraulic pressure for actuating said pulling tool;
- hydraulic lines for conveying said hydraulic pressure to said pulling tool from said power pack;
- a pressure regulator connected to said power pack for regulating the hydraulic pressure delivered to said pulling tool; and
- a gauge attached to said power pack for indicating the pressure delivered to said pulling tool to enable the operator thereof to adjust the hydraulic pressure to the desired level.

12. A device for pressing a bushing into one end of a bore in a part while guiding said bushing for axial alignment with said bore during insertion with an opposite coaxial end of said bore, said device comprising:
- an axially elongated mandrel having attached at one end thereof a coupling for connection to a retractable member of a pulling tool for forcibly pulling said retractable member into a barrel of a gun of said pulling tool;
- an anvil having an axial hole extending therethrough for receiving said mandrel with a sliding fit, said anvil having a proximal end with a surface for operative engagement with said barrel, and a distal end with a surface for engagement with and exerting a reaction force on structure surrounding said mandrel;
- a guide sleeve having an axial hole therethrough, said axial hole sized to slidably receive said mandrel, said guide sleeve being sized to fit within said opposite coaxial end of said bore to maintain said mandrel in coaxial alignment in said bore during insertion of said bushing;
- a collar having a connection to said mandrel at a position on said mandrel remote from said anvil for transmitting an axial force, exerted by said pulling tool retractable member on said mandrel, operatively on a portion of said part;
- whereby sad bushing is pressed straight into said bore by an axial squeezing force exerted between said anvil and said collar when said pulling tool pulls said mandrel axially through said axial hole in said anvil.

13. A device as claimed in claim 12, wherein:
said guide sleeve has a reduced diameter end sized to fit snugly into an axial passage through a second bushing, whereby said guide sleeve, after use in inserting a bushing at one end of said bore, may be used to insert said second bushing in said opposite end of said bore.

14. A device as claimed in claim 12, further comprising:
- a secondary guide sleeve having a portion with an outside diameter sized to fit within a hole through a second bushing with a close sliding fit, and having an axial hole sized to receive said mandrel with a close sliding fit;
- whereby said mandrel may be inserted into said secondary guide sleeve to align said mandrel with said bore when a second bushing is to be installed in the other end of said bore.

15. A device as claimed in claim 12, wherein:
said collar has a U-shaped opening therein sized to be slidably received in annular groove in said mandrel;
whereby said collar can be easily inserted and removed from said groove and, when inserted, transmits the axial force exerted by said mandrel, as it is being pulled toward said pulling tool, which, together with a reaction force exerted by said anvil, produces said squeezing force.

16. A device for removing a bushing, located coaxially in a bore in a part, from said bore by exerting an axial force on said bushing and reacting said axial force with an equal and opposite reaction axial force exerted on said part around said bushing, comprising:
- an axially elongated mandrel having attached at one end thereof a coupling for connection to a retractable member of a pulling tool for forcibly pulling said retractable member into a barrel of a gun of said pulling tool;
- an anvil having an axial hole extending therethrough for receiving said mandrel with a sliding fit, said anvil having a proximal end with a surface for operative engagement with said barrel, and a distal end with a surface for engagement with and exerting a reaction force on structure surrounding said mandrel;
- a guide sleeve having an axial hole therethrough, said axial hole sized to slidably receive sad mandrel, said guide sleeve being sized to fit within said bore to maintain said mandrel in coaxial alignment in said bore during removal of said bushing;
- a cup having a cylindrical wall and a floor at one end of said cylindrical wall, said floor having an axial hole therethrough coaxial with said cylindrical wall and sized to receive said mandrel with a sliding fit;
- a collar having a connection to said mandrel at a position on said mandrel remote form said anvil for transmitting an axial force, exerted by said pulling tool retractable member on said mandrel, to one of said guide sleeve and said cup floor;
- whereby axial force can be exerted by one of said collar and said anvil operatively through said guide sleeve on said bushing, and an equal and opposite axial force can be exerted by the other of said collar and said anvil operatively through said cup cylindrical wall on said part around said bushing to press said bushing straight out of said bore and into said cup.

17. A device as claimed in claim 16, wherein:
said guide sleeve has a reduced diameter end sized to fit snugly into an axial passage through said bushing, whereby said guide sleeve guides said mandrel coaxially in said bore during removal of said bushing and also maintains said mandrel coaxially in said bore around said bushing has been removed.

18. A device as claimed in claim 16, further comprising:
- a second guide sleeve having a portion with an outside diameter sized to fit within a second end of said bore remote from a first end of said bore from which said bushing is to be removed, said second guide sleeve having an axial hole sized to receive said mandrel with a close sliding fit;
- whereby said mandrel may be inserted into said second guide sleeve to align said mandrel with said bore while said bushing is being removing from said first end of said bore.

19. A device as claimed in claim 18, further comprising:
- a spacer having an axial hole therethrough sized to receive said mandrel with a close sliding fit and having a length to extend between said second guide sleeve and said cup floor;
- whereby said anvil can exert said reaction force on said second guide sleeve, which reaction force is transmitted through said second guide sleeve to said spacer, and thence through said spacer to said cup to exert said reaction force on said part around said bushing.

20. A device as claimed in claim 16, wherein:
- said collar has a U-shaped opening therein sized to be slidably receive din an annular groove in said mandrel;
- whereby said collar can be easily inserted and removed from said groove and, where inserted, transmits the axial force exerted by said mandrel, as it is being pulled toward said pulling tool, which, together with a reaction force exerted by said anvil, produces said squeezing force.

* * * * *